United States Patent
Yoshinaga et al.

(10) Patent No.: US 9,923,456 B2
(45) Date of Patent: Mar. 20, 2018

(54) MATRIX CONVERTOR, POWER GENERATION SYSTEM, AND METHOD FOR CONTROLLING POWER FACTOR

(71) Applicant: KABUSHIKI KAISHA YASKAWA DENKI, Kitakyushu-shi (JP)

(72) Inventors: Wataru Yoshinaga, Kitakyushu (JP); Takashi Tanaka, Kitakyushu (JP); Kentaro Inomata, Kitakyushu (JP); Kotaro Takeda, Kitakyushu (JP); Takuya Naka, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/791,258

(22) Filed: Jul. 3, 2015

(65) Prior Publication Data

US 2016/0006345 A1 Jan. 7, 2016

(30) Foreign Application Priority Data

Jul. 4, 2014 (JP) ................................. 2014-138545

(51) Int. Cl.
| | |
|---|---|
| *H02M 1/42* | (2007.01) |
| *H02M 1/12* | (2006.01) |
| *H02M 5/297* | (2006.01) |
| *H02P 27/16* | (2006.01) |

(Continued)

(52) U.S. Cl.
CPC ......... *H02M 1/4208* (2013.01); *H02M 1/126* (2013.01); *H02M 1/42* (2013.01); *H02M 5/297* (2013.01); *H02P 21/22* (2016.02); *H02P 23/26* (2016.02); *H02P 27/16* (2013.01); *Y02B 70/12* (2013.01)

(58) Field of Classification Search
CPC .................................. H02M 1/42; H02P 27/16
USPC ................................ 318/400.26, 400.01, 700
See application file for complete search history.

(56) References Cited

U.S. PATENT DOCUMENTS

| | | | | |
|---|---|---|---|---|
| 4,729,082 A | * | 3/1988 | Sato ..................... | H02M 1/4233 363/41 |
| 5,428,283 A | * | 6/1995 | Kalman ................ | H02J 3/1892 318/438 |

(Continued)

FOREIGN PATENT DOCUMENTS

| | | |
|---|---|---|
| JP | 57-119672 | 7/1982 |
| JP | 2002-354815 | 12/2002 |

(Continued)

OTHER PUBLICATIONS

Itoh et al., "A High Energy Saving Interface System Using a Matrix Converter between a Power Grid and an Engine Generator for Bio Diesel Fuel", Jun. 19, 2011, pp. 1-7, IEEE Trondheim Powertech, Piscataway, NJ, USA, XP032263454.

(Continued)

*Primary Examiner* — Kawing Chan
(74) *Attorney, Agent, or Firm* — Mori & Ward, LLP

(57) ABSTRACT

A matrix convertor includes a power convertor and a controller. The power convertor is disposed between a power system and a rotating electric machine, and includes a plurality of bidirectional switches. The controller is configured to control an exciting current flowing from the power convertor to the rotating electric machine so as to control a power factor on a side of the power system.

6 Claims, 5 Drawing Sheets

(51) Int. Cl.
*H02P 21/22* (2016.01)
*H02P 23/26* (2016.01)

(56) References Cited

U.S. PATENT DOCUMENTS

| | | | | |
|---|---|---|---|---|
| 5,585,708 A | * | 12/1996 | Richardson | H02M 5/4585 318/722 |
| 5,798,631 A | * | 8/1998 | Spee | F03D 7/0272 290/31 |
| 6,069,808 A | * | 5/2000 | Panahi | H02M 7/53875 363/98 |
| 6,201,715 B1 | * | 3/2001 | Huggett | H02J 3/1842 307/105 |
| 6,583,995 B2 | * | 6/2003 | Kalman | H02M 7/219 318/801 |
| 7,733,677 B2 | * | 6/2010 | Cheng | H02M 1/4233 363/127 |
| 8,848,399 B2 | * | 9/2014 | Sagneri | H02M 3/158 363/21.02 |
| 2004/0260488 A1 | * | 12/2004 | Al-Hamrani | G05F 1/70 702/60 |
| 2009/0085510 A1 | * | 4/2009 | Pande | H02M 1/4216 318/729 |
| 2010/0226157 A1 | * | 9/2010 | Ohnishi | H02M 5/4585 363/131 |
| 2010/0301787 A1 | * | 12/2010 | Gallegos-Lopez | H02P 21/22 318/400.02 |
| 2011/0019452 A1 | * | 1/2011 | Shinomoto | H02M 1/4208 363/126 |
| 2011/0227522 A1 | * | 9/2011 | Shinomoto | H02M 1/4225 318/400.29 |
| 2012/0206946 A1 | * | 8/2012 | Sagneri | H02M 3/158 363/68 |
| 2012/0223531 A1 | * | 9/2012 | Brooks | F01D 15/10 290/1 R |
| 2012/0287686 A1 | * | 11/2012 | Yamamoto | H02M 5/297 363/78 |
| 2013/0328309 A1 | | 12/2013 | Fujii et al. | |
| 2013/0335041 A1 | * | 12/2013 | Baek | H02M 7/12 322/89 |
| 2016/0006389 A1 | * | 1/2016 | Takeda | H02M 1/126 318/400.26 |

FOREIGN PATENT DOCUMENTS

| | | |
|---|---|---|
| WO | WO 01/91279 | 11/2001 |
| WO | WO 2012/111416 | 8/2012 |

OTHER PUBLICATIONS

Haruna et al., "Modeling Design for a Matrix Converter with a Generator as Input", Aug. 17, 2008, pp. 1-7, IEEE, Control and Modeling for Power Electronics, Piscataway, NJ, USA, XP031328391.

Extended European Search Report for corresponding EP Application No. 15174751.6-1809, Dec. 7, 2015.

Chinese Office Action for corresponding CN Application No. 201510369401.9, Jun. 2, 2017.

Japanese Office Action for corresponding JP Application No. 2014-138545, Sep. 26, 2017 (w/ English machine translation).

* cited by examiner

MATRIX CONVERTOR, POWER GENERATION SYSTEM, AND METHOD FOR CONTROLLING POWER FACTOR

CROSS-REFERENCE TO RELATED APPLICATIONS

The present application claims priority under 35 U.S.C. § 119 to Japanese Patent Application No. 2014-138545, filed Jul. 4, 2014. The contents of this application are incorporated herein by reference in their entirety.

BACKGROUND

Field of the Invention

The embodiments disclosed herein relate to a matrix convertor, a power generation system, and a method for controlling a power factor.

Discussion of the Background

Japanese Unexamined Patent Application Publication No. 2002-354815 discloses a power convertor to serve as a matrix convertor. The matrix convertor directly converts voltage of an AC (Alternating-Current) power source (such as a power system) into a desired frequency and voltage. Such matrix convertors suppress harmonics current and effectively utilize regeneration power, and thus have been attracting attention as coming power convertors.

SUMMARY

According to one aspect of the present disclosure, a matrix convertor includes a power convertor and a controller. The power convertor is disposed between a power system and a rotating electric machine, and includes a plurality of bidirectional switches. The controller is configured to control an exciting current flowing from the power convertor to the rotating electric machine so as to control a power factor on a side of the power system.

According to another aspect of the present disclosure, a power generation system includes a power generator including a rotating electric machine. The rotating electric machine includes a power convertor and a controller. The power convertor is disposed between a power system and a rotating electric machine, and includes a plurality of bidirectional switches. The controller is configured to control an exciting current flowing from the power convertor to the rotating electric machine so as to control a power factor on a side of the power system.

According to the other aspect of the present disclosure, a method for controlling a power factor includes detecting a reactive current or reactive power supplied from a matrix convertor to a power system. The matrix convertor includes a power convertor disposed between the power system and a rotating electric machine. The power convertor includes a plurality of bidirectional switches. An exciting current flowing from the power convertor to the rotating electric machine is controlled so as to control a power factor on a side of the power system based on at least one of the reactive current and the reactive power.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

A matrix convertor, a power generation system, and a method for controlling a power factor according to embodiments will be described in detail below with reference to the accompanying drawings. The following embodiments are provided for exemplary purposes only and are not intended to limit the present disclosure.

1. Power Generation System

Figure 1:
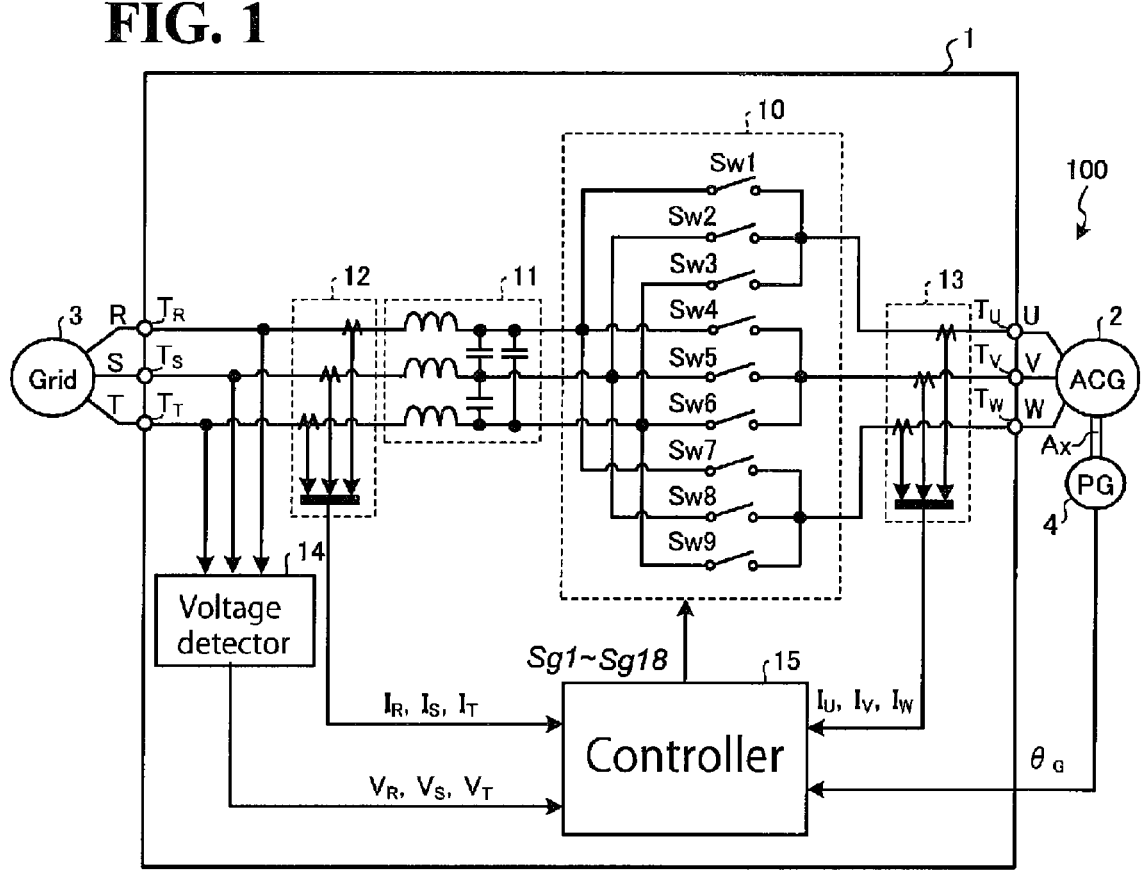
FIG. 1 is a schematic diagram illustrating an exemplary configuration of a power generation system according to an embodiment.

FIG. 1 is a schematic diagram illustrating an exemplary configuration of the power generation system according to the embodiment. As illustrated in FIG. 1, a power generation system 100 according to the embodiment includes a matrix convertor 1 and a rotating electric machine 2. The matrix convertor 1 is disposed between the rotating electric machine 2 and a three-phase AC power system 3 to perform power conversion between the rotating electric machine 2 and the power system 3.

In this embodiment, an AC generator (ACG) such as a synchronous motor will be described as an example of the rotating electric machine 2. The rotating electric machine 2, however, will not be limited to the AC generator. Another possible example is an AC motor. A position detector 4 is disposed on a rotation shaft Ax of the rotating electric machine 2. The position detector 4 detects rotation position $\theta_G$, which represents the rotor position (machine angle) of the rotating electric machine 2. The rotation position $\theta_G$ detected by the position detector 4 is input into the matrix convertor 1.

2. Matrix Convertor 1

As illustrated in FIG. 1, the matrix convertor 1 includes a power convertor 10, a filter 11, current detectors 12 and 13, a voltage detector 14, a controller 15, terminals $T_R$, $T_S$, and $T_T$, and terminals $T_U$, $T_V$, and $T_W$. The rotating electric machine 2 is connected to the terminals $T_U$, $T_V$, and $T_W$. The power system 3 is connected to the terminals $T_R$, $T_S$, and $T_T$.

The power convertor 10 includes a plurality of bidirectional switches Sw1 to Sw9. The plurality of bidirectional switches Sw1 to Sw9 connect the R phase, the S phase, and the T phase of the power system 3 to each of the U phase, the V phase, and the W phase of the rotating electric machine 2. The bidirectional switches Sw1 to Sw3 respectively connect the R phase, the S phase, and the T phase of the power system 3 to the U phase of the rotating electric machine 2.

The bidirectional switches Sw4 to Sw6 respectively connect the R phase, the S phase, and the T phase of the power system 3 to the V phase of the rotating electric machine 2. The bidirectional switches Sw7 to Sw9 respectively connect the R phase, the S phase, and the T phase of the power system 3 to the W phase of the rotating electric machine 2.

Figure 2:
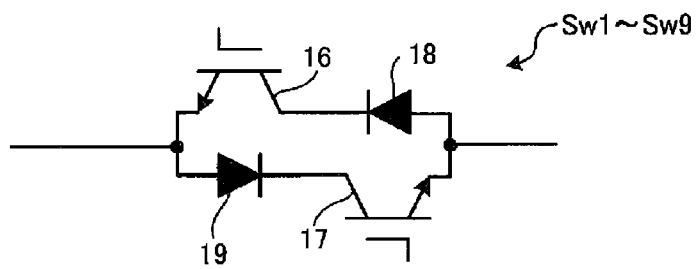
FIG. 2 is a schematic diagram illustrating an exemplary bidirectional switch.

The bidirectional switches Sw1 to Sw9 each have an exemplary configuration illustrated in FIG. 2. FIG. 2 is a schematic diagram illustrating the exemplary configuration of each of the bidirectional switches Sw1 to Sw9. As illustrated in FIG. 2, each of the bidirectional switches Sw1 to Sw9 includes a series connector made up of a switching element 16 and a diode 18, and a series connector made up of a switching element 17 and a diode 19. The two series connectors are oriented in opposite directions and connected in parallel to each other.

Examples of the switching elements 16 and 17 include, but are not limited to, semiconductor switching elements such as Metal-Oxide-Semiconductor Field-Effect Transistors (MOSFET) and Insulated Gate Bipolar Transistors (IGBT). Alternatively, the switching elements 16 and 17 may be next-generation semiconductor switching elements such as SiC and GaN.

The bidirectional switches Sw1 to Sw9 will not be limited to the configuration illustrated in FIG. 2. For example, while in the example illustrated in FIG. 2 the cathodes of the diodes 18 and 19 are not connected to each other, the bidirectional switches Sw1 to Sw9 may have a configuration in which the cathodes of the diodes 18 and 19 are connected to each other. In the case where the switching elements 16 and 17 are reverse blocking IGBTs, it is not necessary to provide the diodes 18 and 19.

Referring back to FIG. 1, the matrix convertor 1 will be further described. The filter 11 is disposed between the power convertor 10 and the R phase, the S phase, and the T phase of the power system 3 so as to suppress the influence of noise from the power convertor 10 with respect to the power system 3. Specifically, the filter 11 includes three reactors and three capacitors, and removes switching noise caused by switching of the bidirectional switches Sw1 to Sw9, which constitute the power convertor 10. It is noted that the filter 11 will not be limited to the LC filter configuration illustrated in FIG. 1.

The current detector 12 is disposed between the power system 3 and the filter 11, and detects instantaneous values $I_R$, $I_S$, and $I_T$ of currents respectively flowing between the matrix convertor 1 and the R phase, the S phase, and the T phase of the power system 3 (hereinafter referred to as system-side currents $I_R$, $I_S$, and $I_T$). The current detector 12 detects current using, for example, Hall elements, which are magneto-electric conversion elements.

The current detector 13 is disposed between the power convertor 10 and the rotating electric machine 2, and detects instantaneous values $I_U$, $I_V$, and $I_W$ of currents flowing respectively between the matrix convertor 1 and the U phase, the V phase, and the W phase of the rotating electric machine 2 (hereinafter referred to as machine-side currents $I_U$, $I_V$, and $I_W$). The current detector 13 detects current using, for example, Hall elements, which are magneto-electric conversion elements.

The voltage detector 14 is disposed between the power system 3 and the power convertor 10, and detects voltages $V_R$, $V_S$, and $V_T$ respectively of the R phase, the S phase, and the T phase of the power system 3 (hereinafter referred to as system-side voltages $V_R$, $V_S$, and $V_T$).

The controller 15 controls the power convertor 10. For example, the controller 15 controls the power convertor 10 based on the rotation position $\theta_G$, the system-side currents $I_R$, $I_S$, and $I_T$, the machine-side currents $I_U$, $I_V$, and $I_W$, and the system-side voltages $V_R$, $V_S$, and $V_T$.

The controller 15 regulates an input power factor angle $\theta$in to control a power factor $\lambda$grid on the power system 3 side (hereinafter referred to as system-side power factor $\lambda$grid). The input power factor angle $\theta$in is a power factor angle of power supplied from the power convertor 10 to the power system 3 side. The system-side power factor $\lambda$grid is a power factor angle of power supplied from the matrix convertor 1 to the power system 3 side, and is a power factor as seen from the power system 3.

When the rotation speed, $\omega_G$, of the rotating electric machine 2 is high, the controller 15 regulates the system-side power factor $\lambda$grid by regulating the input power factor angle $\theta$in. At a low rotation speed $\omega_G$ of the rotating electric machine 2, however, it may be difficult to regulate the system-side power factor $\lambda$grid by merely regulating the input power factor angle $\theta$in. This will be described in detail below.

In the matrix convertor 1, the filter 11 is disposed between the power convertor 10 and the power system 3, as illustrated in FIG. 1. The filter 11 causes leading reactive current to flow to the power system 3, thereby generating leading reactive power Qini. At a low rotation speed $\omega_G$ of the rotating electric machine 2, even though the input power factor angle $\theta$in is changed, it may be impossible or difficult to cause lagging reactive current, which cancels the leading reactive power Qini, to flow from the power convertor 10 toward the power system 3.

For example, generation power (active power) $P_G$ supplied from the rotating electric machine 2 to the matrix convertor 1, reactive power Qgrid supplied from the matrix convertor 1 to the power system 3, input power factor angle $\theta$in, and leading reactive power Qini satisfy the following Formula (1). It is noted that loss in the power convertor 10 is negligible.

$$Q\text{grid} = P_G \times \tan(\theta\text{in}) - Q\text{ini} \quad (1)$$

At a low rotation speed $\omega_G$ of the rotating electric machine 2, the generation power $P_G$ is small. Hence, regulating the input power factor angle $\theta$in may not make $P_G \times \tan(\theta\text{in})$ exceed the leading reactive power Qini in Formula (1). In this case, the reactive power Qgrid is negative. This causes difficulty in controlling the system-side power factor $\lambda$grid to be "1" or lagging power factor by the regulation of the input power factor angle $\theta$in.

Figure 3:
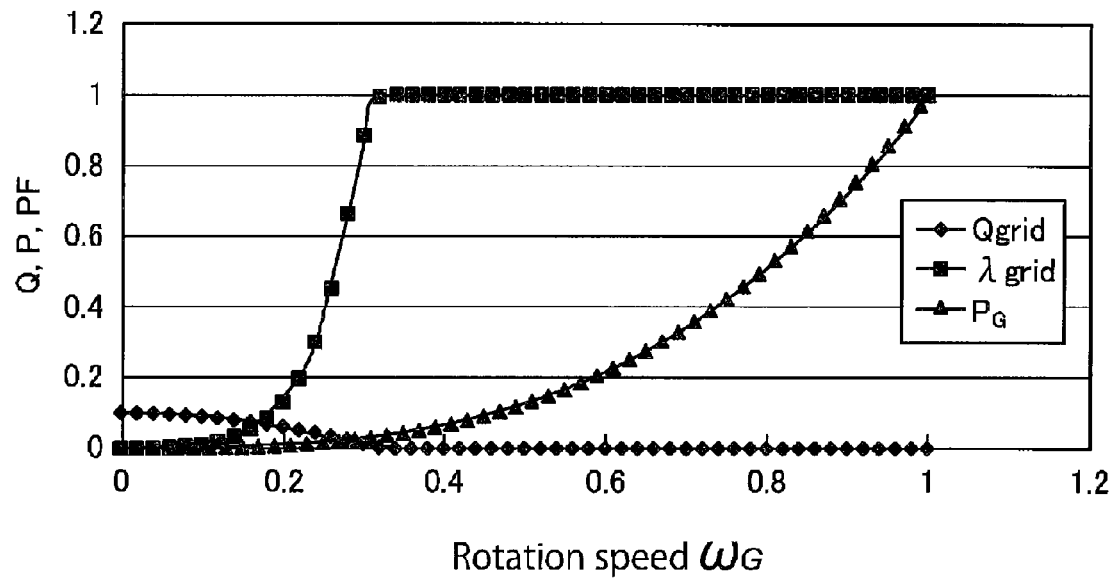
FIG. 3 is a graph illustrating an exemplary relationship of rotation speed with active power, reactive power, and system-side power factor with power factor angle being adjusted.

FIG. 3 is a graph illustrating an exemplary relationship of the rotation speed $\omega_G$ with the generation power $P_G$, the reactive power Qgrid, and the system-side power factor $\lambda$grid with the input power factor angle $\theta$in being regulated. As illustrated in FIG. 3, in the power factor control by regulating the input power factor angle $\theta$in, the system-side power factor $\lambda$grid is made to be "1" when the rotation speed $\omega_G$ is equal to or higher than approximately 30% of the rated rotation speed of the rotating electric machine 2. In contrast, the system-side power factor $\lambda$grid is not made to be "1" when the rotation speed $\omega_G$ is lower than approximately 30% of the rated rotation speed of the rotating electric machine 2.

Figure 4:
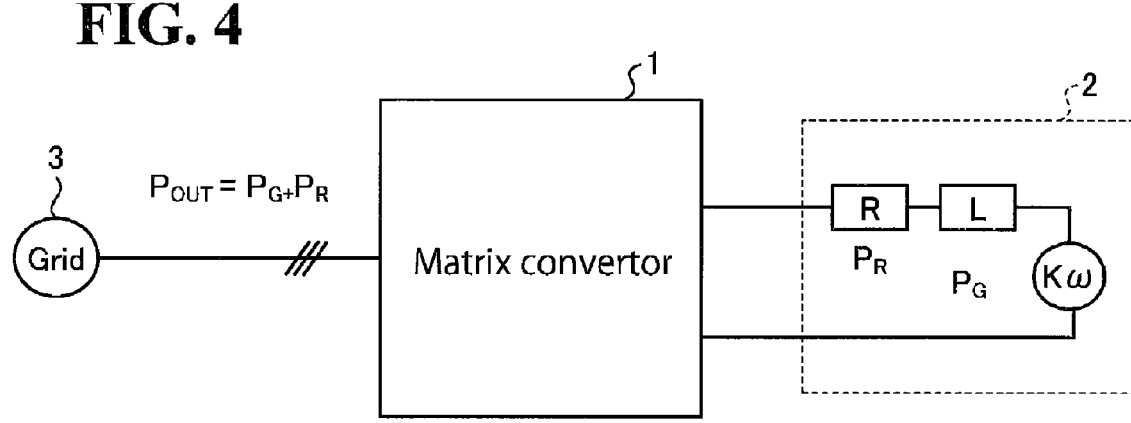
FIG. 4 is a schematic diagram illustrating control of the system-side power factor by exciting current.

In view of this, the controller 15 controls the exciting current flowing from the power convertor 10 to the rotating electric machine 2 so as to control the system-side power factor λgrid. FIG. 4 is a schematic diagram illustrating control of the system-side power factor λgrid using the exciting current.

In the example illustrated in FIG. 4, the rotating electric machine 2 has winding resistance R. When a current of a frequency corresponding to the rotation speed $\omega_G$ flows through the rotating electric machine 2, power loss $P_R$ occurs due to the winding resistance R. An example of the power loss $P_R$ is copper loss, in which case the rotating electric machine 2 includes copper windings.

The controller 15 controls the power convertor 10 to cause exciting current to flow from the power convertor 10 to the rotating electric machine 2, thereby generating the power loss $P_R$. Thus, the power generated by the rotating electric machine 2 is a sum of the generation power $P_G$ of the rotating electric machine 2 and the power loss $P_R$.

The controller 15 supplies the power loss $P_R$ thus generated from the power convertor 10 toward the power system 3 as reactive power. In this manner, lagging reactive current to cancel the leading reactive power Qini flows from the power convertor 10 toward the power system 3. This ensures that the controller 15 accurately regulates the system-side power factor λgrid even at a low rotation speed $\omega_G$.

For example, when the power generation system 100 is a wind power generation system, the rotating electric machine 2 is connected to a rotor (such as a propeller of a wind mill). In this case, when the wind is weak, the rotation speed of the rotor is low. Consequently, the rotation speed $\omega_G$ of the rotating electric machine 2 is low. Even in this case, the power generation system 100 controls the exciting current flowing from the power convertor 10 to the rotating electric machine 2 to control the system-side power factor λgrid. This ensures accurate regulation of the system-side power factor λgrid. For example, the system-side power factor λgrid can be made to accord with a power factor required by the power system 3 side.

It is the exciting current that is caused to flow toward the rotating electric machine 2 to generate the power loss $P_R$. Although torque is not generated in the rotating electric machine 2, switching of the bidirectional switches Sw1 to Sw9 causes the power generated by the rotating electric machine 2 to be supplied from the power convertor 10 toward the power system 3 as lagging reactive power.

3. Configuration of Controller 15

Figure 5:
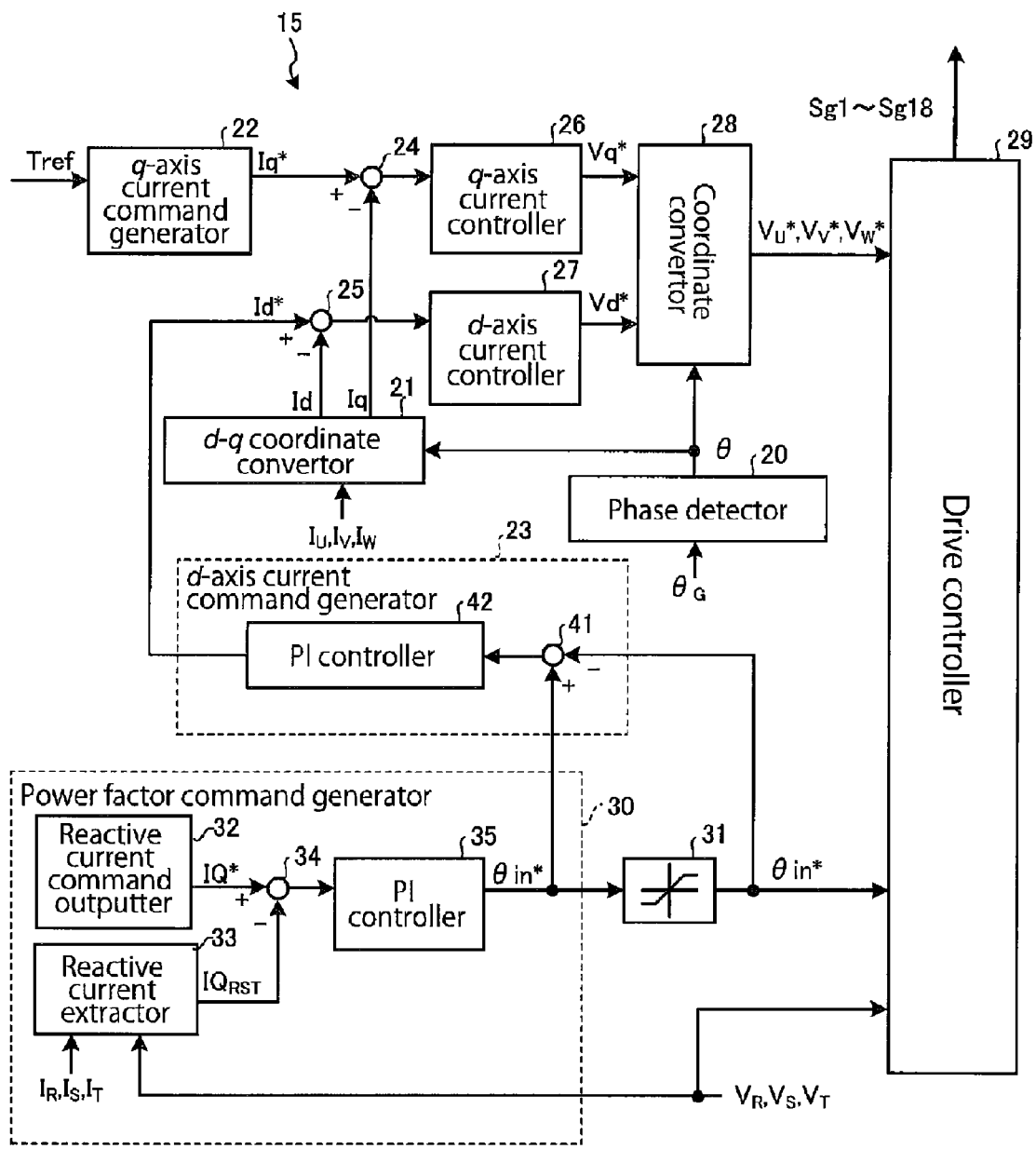
FIG. 5 is a schematic diagram illustrating an exemplary configuration of a controller of a matrix convertor.

FIG. 5 is a schematic diagram illustrating an exemplary configuration of the controller 15. As illustrated in FIG. 5, the controller 15 includes a phase detector 20, a d-q coordinate convertor 21, a q-axis current command generator 22, a d-axis current command generator 23, subtractors 24 and 25, a q-axis current controller 26, a d-axis current controller 27, a coordinate convertor 28, a drive controller 29, a power factor command generator 30, and a limiter 31.

The controller 15 is implemented by a microcomputer including, for example, a central processing unit (CPU), a read only memory (ROM), a random access memory (RAM), and input/output ports, or an integrated circuit such as an application specific integrated circuit (ASIC) and a field programmable gate array (FPGA).

The CPU of the microcomputer reads and executes a program stored in the ROM to implement part or all of the functions of the components 20 to 31. Alternatively, the integrated circuit such as the ASIC and the FPGA may execute part or all of the functions of the components 20 to 31.

The phase detector 20, for example, multiplies the rotation position $\theta_G$, which has been detected by the position detector 4, by the number of poles of the rotating electric machine 2, so as to detect the electrical angle phase θ of the rotating electric machine 2.

The d-q coordinate convertor 21 calculates d-axis current Id and q-axis current Iq from the machine-side currents $I_U$, $I_V$, and $I_W$. The d-q coordinate convertor 21 converts, for example, the machine-side currents $I_U$, $I_V$, and $I_W$ into α-β components, which are coordinates of a fixed coordinate system defined by two perpendicular axes. Based on the electrical angle phase θ, the d-q coordinate convertor 21 converts the components of the α-β axis coordinate system into components of a d-q axis coordinate system so as to calculate the d-axis current Id and the q-axis current Iq. The d axis is an axis parallel to the magnetic flux of the rotating electric machine 2, and the q axis is an axis perpendicular to the d axis.

The q-axis current command generator 22 generates a q-axis current command Iq*. The q-axis current command generator 22 calculates the q-axis current command Iq* corresponding to a torque command T* using a torque-current scale factor K, for example. The q-axis current command Iq* is a target value of torque current to flow to the rotating electric machine 2.

The d-axis current command generator 23 generates a d-axis current command Id* (which is an example of the exciting current command). The d-axis current command Id* is a target value of exciting current to flow to the rotating electric machine 2. The d-axis current command Id* causes the exciting current to flow to the rotating electric machine 2. The d-axis current command generator 23 will be described in detail later.

The subtractor 24 subtracts the q-axis current Iq from the q-axis current command Iq*. The subtractor 25 subtracts the d-axis current Id from the d-axis current command Id*.

An example of the q-axis current controller 26 is a proportional integral (PI) controller. By proportional integral control, the q-axis current controller 26 generates such a q-axis voltage command Vq* that makes the deviation between the q-axis current command Iq* and the q-axis current Iq zero. An example of the d-axis current controller 27 is a PI controller. By proportional integral control, the d-axis current controller 27 generates such a d-axis voltage command Vd* that makes the deviation between the d-axis current command Id* and the d-axis current Id zero. Instead of the PI controllers, the q-axis current controller 26 and the d-axis current controller 27 may be PID controllers, for example.

Based on the q-axis voltage command Vq* of the q-axis current controller 26 and based on the d-axis voltage command Vd* of the d-axis current controller 27, the coordinate convertor 28 calculates an amplitude M of the voltage command and a phase command θa*. The coordinate convertor 28 calculates the amplitude M of the voltage command using the following exemplary Formula (2), and the phase command θa* using the following exemplary Formula (3), for example:

$$M = (Vd^{*2} + Vq^{*2})^{1/2} \qquad (2)$$

$$\theta a^* = \tan^{-1}(Vq^*/Vd^*) \qquad (3)$$

Based on the amplitude M of the voltage command, the phase command θa*, and the electrical angle phase θ, the coordinate convertor 28 generates a voltage command Vu* of the U phase, a voltage command Vv* of the V phase, and a voltage command Vw* of the W phase. The coordinate convertor 28 calculates the voltage commands Vu*, Vv*, and Vw* using the following exemplary Formulae (4) to (6):

$$Vu^* = M \times \sin(\theta + \theta a^*) \quad (4)$$

$$Vv^* = M \times \sin(\theta + \theta a^* - 2\pi/3) \quad (5)$$

$$Vw^* = M \times \sin(\theta + \theta a^* + 2\pi/3) \quad (6)$$

The drive controller 29 generates gate signals Sg1 to Sg18 based on the voltage commands Vu*, Vv*, and Vw*, based on the system-side voltages $V_R$, $V_S$, and $V_T$, and based on the input power factor angle command θin*. The gate signals Sg1 to Sg18 are respectively input into the gates of the switching elements of the bidirectional switches Sw1 to Sw9. In this manner, the power convertor 10 is controlled.

For example, in a period of time in which the magnitude order of the system-side voltages $V_R$, $V_S$, and $V_T$ does not change, the drive controller 29 regards the system-side voltages $V_R$, $V_S$, and $V_T$ in descending order as input phase voltages Ep, Em, and En. The drive controller 29 converts the voltage commands Vu*, Vv*, and Vw* into pulse width modulation (PWM) signals based on the input power factor angle command θin*. The PWM signals correspond to the respective values of the input phase voltages Ep, Em, and En. The drive controller 29 subjects the PWM signals to commutation control processing to generate the gate signals Sg1 to Sg18.

Figure 6:
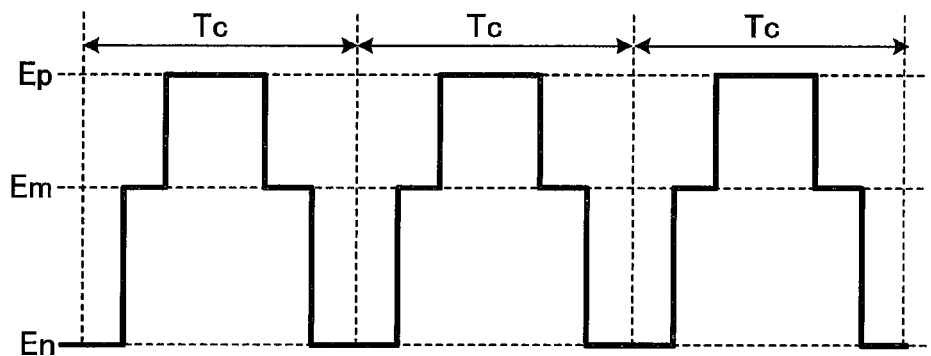
FIG. 6 is a graph illustrating exemplary switching among voltages output to a rotating electric machine.

FIG. 6 is a graph illustrating exemplary switching among the input phase voltages Ep, Em, and En output to the rotating electric machine 2. As illustrated in FIG. 6, by controlling the bidirectional switches Sw1 to Sw9 using the gate signals Sg1 to Sg18, the input phase voltages output to the rotating electric machine 2 are switched in the manner En→Em→Ep→Em→En in one period of time Tc of the PWM signal. It is noted that the manner of switching the input phase voltages output to the rotating electric machine 2 will not be limited to En→Em→Ep→Em→En.

Referring back to FIG. 5, the controller 15 will be further described. The power factor command generator 30 generates an input power factor angle command θin* (which is an example of the power factor command). The power factor command generator 30 includes a reactive current command outputter 32, a reactive current extractor 33, a subtractor 34, and a PI controller 35.

The reactive current command outputter 32 outputs a reactive current command IQ* (which is an example of the target value). For example, when the reactive current command IQ* is zero, the power factor command generator 30 generates such an input power factor angle command θin* that makes the system-side power factor λgrid "1".

When the target system-side power factor λgrid (hereinafter referred to as target power factor) is other than "1", the reactive current command outputter 32 regards, for example, the value of the reactive current IQ on the power system 3 side corresponding to the target power factor as the reactive current command IQ*. For example, when the target power factor is set, the reactive current command outputter 32 regards the value of the reactive current IQ on the power system 3 side corresponding to the target power factor as the reactive current command IQ* based on the set target power factor and the generation power $P_G$. The reactive current command outputter 32 detects or estimates the generation power $P_G$ from, for example, the amplitude M and the q-axis current command Iq*.

The reactive current extractor 33 detects reactive current $IQ_{RST}$. The reactive current extractor 33 calculates system-side voltage phase $\theta_{RST}$ from, for example, the system-side voltages $V_R$, $V_S$, and $V_T$. Based on the system-side voltage phase $\theta_{RST}$, the reactive current extractor 33 extracts the reactive current $IQ_{RST}$ included in the system-side currents $I_R$, $I_S$, and $I_T$.

For example, the reactive current extractor 33 detects effective values $I_{RST}$ of the system-side currents $I_R$, $I_S$, and $I_T$, and calculates the reactive current $IQ_{RST}$ using the following Formula (7). Alternatively, the reactive current extractor 33 may estimate the reactive current $IQ_{RST}$ so as to detect the reactive current $IQ_{RST}$. For example, the reactive current extractor 33 may acquire a result of an estimation performed using an observer as a detection value of the reactive current $IQ_{RST}$.

$$IQ_{RST} = I_{RST} \times \sin(\theta_{RST}) \quad (7)$$

The subtractor 34 subtracts the reactive current $IQ_{RST}$ from the reactive current command IQ*. By proportional integral control, the PI controller 35 generates such an input power factor angle command θin* that makes the deviation between the reactive current command IQ* and the reactive current $IQ_{RST}$ zero. The drive controller 29 generates the gate signals Sg1 to Sg18 to make the input power factor angle θin equal to the input power factor angle command θin*. The power factor command generator 30 may include, for example, a PID controller in place of the PI controller 35.

The power factor command generator 30 generates the input power factor angle command θin* based on the reactive current command IQ* and the reactive current $IQ_{RST}$. Alternatively, the power factor command generator 30 may generate the input power factor angle command θin* based on a reactive power command $Q_{RST}^*$ (which is an example of the target value) and based on reactive power $Q_{RST}$. In this case, the power factor command generator 30 uses a reactive power command generator to generate the reactive power command $Q_{RST}^*$ in place of the reactive current command outputter 32, and uses a reactive power extractor to detect the reactive power $Q_{RST}$ in place of the reactive current extractor 33. It is noted that the detection of the reactive power $Q_{RST}$ includes estimation of the reactive power $Q_{RST}$. In this case as well, the reactive power command $Q_{RST}^*$ is made to be zero to generate such an input power factor angle command θin* that makes the system-side power factor λgrid "1". The reactive power extractor calculates, for example, the reactive power $Q_{RST}$ from the reactive current $IQ_{RST}$ and from the system-side voltages $V_R$, $V_S$, and $V_T$.

To maintain the input power factor angle command θin* within a predetermined range, the limiter 31 limits the input power factor angle command θin* between a lower limit value θth1 and an upper limit value θth2 in outputting the input power factor angle command θin*. For example, the limiter 31 may limit the input power factor angle command θin* within a range of −30 degrees to +30 degrees. In this case, the limiter 31 sets the lower limit value θth1 at −30 degrees and the upper limit value θth2 at +30 degrees.

The d-axis current command generator 23 generates the d-axis current command Id* based on a difference between the input power factor angle command θin* output from the power factor command generator 30 and the input power factor angle command θin* output from the limiter 31. When the input power factor angle command θin* generated by the power factor command generator 30 is limited by the limiter 31, the d-axis current command generator 23 generates the d-axis current command Id* to control the system-side power factor λgrid. Thus, the d-axis current command generator 23 generates the d-axis current command Id* based on a difference between values of the input power factor angle command θin* before and after the input power factor angle command θin* is limited by the limiter 31.

The d-axis current command generator 23 includes a subtractor 41 and a PI controller 42. The subtractor 41 subtracts the input power factor angle command θin* output from the limiter 31 from the input power factor angle command θin* output from the power factor command generator 30.

When the input power factor angle command θin* is out of the predetermined range, the PI controller 42 generates the d-axis current command Id* to make an agreement between the values of the input power factor angle command θin* before and after the input power factor angle command θin* is limited by the limiter 31. This causes exciting current to flow to the rotating electric machine 2 to control the system-side power factor λgrid, and the exciting current causes reactive current corresponding to power loss $P_R$ to occur and to be supplied from the power convertor 10 toward the power system 3. The d-axis current command generator 23 may include, for example, a PID controller instead of the PI controller 42.

It is noted that when the input power factor angle command θin* is within a range not limited by the limiter 31, the system-side power factor λgrid is not controlled by the d-axis current command Id*. Instead, the input power factor angle θin is controlled by the input power factor angle command θin*. In this manner, the system-side power factor λgrid is controlled. This ensures that by, for example, regulating the lower limit value θth1 and the upper limit value θth2, it is possible to change the timing of control of the system-side power factor λgrid by the d-axis current command Id*.

4. Processing Flow by Controller 15

Figure 7:
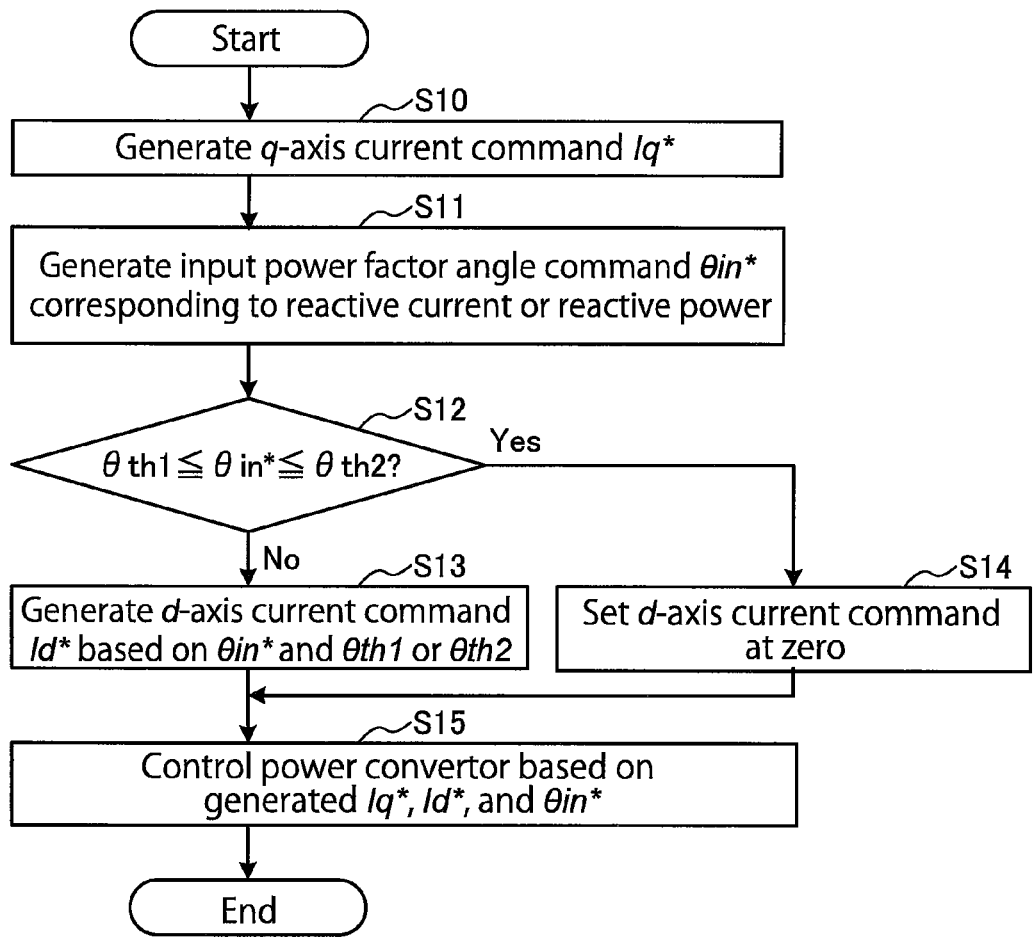
FIG. 7 is a flowchart of exemplary processing performed by the controller.

FIG. 7 is a flowchart of exemplary processing performed by the controller 15. The controller 15 repeatedly performs the processing illustrated in FIG. 7.

As illustrated in FIG. 7, the controller 15 generates a q-axis current command Iq* (step S10). The controller 15 detects or estimates reactive current $IQ_{RST}$ or reactive power $Q_{RST}$ flowing from the matrix convertor 1 to the power system 3, and generates an input power factor angle command θin* corresponding to the reactive current $IQ_{RST}$ or the reactive power $Q_{RST}$ (step S11).

The controller 15 determines whether the input power factor angle command θin* is within the range between the lower limit value θth1 and the upper limit value θth2 (hereinafter referred to as unlimited range) (step S12). When the controller 15 determines that the input power factor angle command θin* is not within the unlimited range (step S12: No), the controller 15 generates a d-axis current command Id* based on the input power factor angle command θin* and based on the lower limit value θth1 or the upper limit value θth2 (step S13).

At step S13, when, for example, the input power factor angle command θin* is smaller than the lower limit value θth1, the controller 15 generates the d-axis current command Id* to make the difference between the input power factor angle command θin* and the lower limit value θth1 zero. When, for example, the input power factor angle command θin* is larger than the upper limit value θth2, the controller 15 generates the d-axis current command Id* to make the difference between the input power factor angle command θin* and the upper limit value θth2 zero.

When the controller 15 determines that the input power factor angle command θin* is within the unlimited range (step S12: Yes), the controller 15 sets the d-axis current command Id* at zero (step S14).

Upon completion of the processing at steps S13 and S14, the controller 15 generates the gate signals Sg1 to Sg18 based on the q-axis current command Iq*, the d-axis current command Id*, and the input power factor angle command θin* thus generated, thereby controlling the power convertor 10 (step S15). This ensures that the controller 15 appropriately controls the system-side power factor λgrid.

5. Other Embodiments

In the above-described embodiment, when the input power factor angle command θin* is smaller than the lower limit value θth1 or exceeds the upper limit value θth2, the controller 15 generates the d-axis current command Id* to control the exciting current. Alternatively, the controller 15 may generate the d-axis current command Id* based on the rotation speed $\omega_G$.

Figure 8:
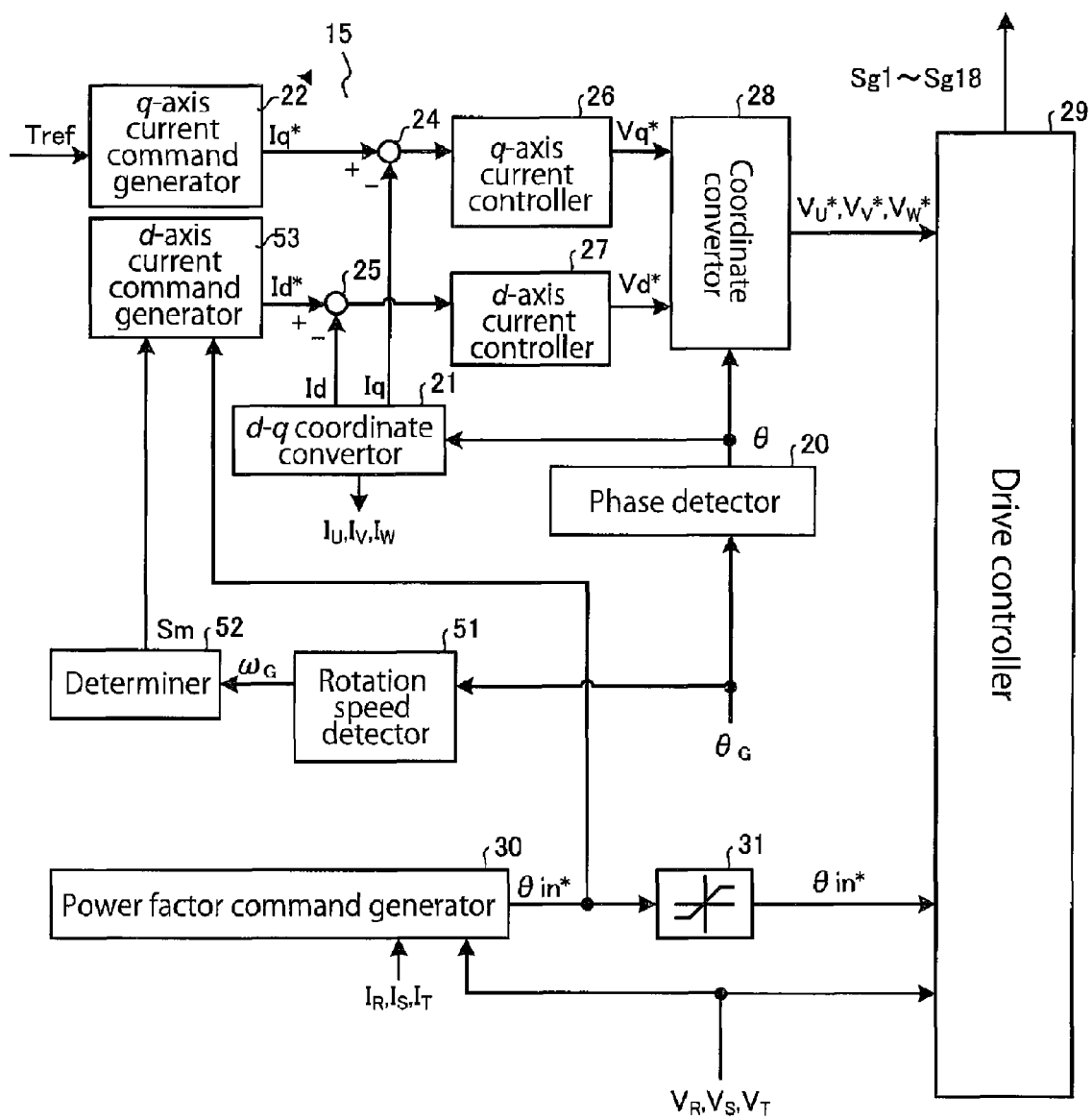
FIG. 8 is a schematic diagram illustrating another exemplary configuration of the controller of the matrix convertor.

FIG. 8 is a schematic diagram illustrating another exemplary configuration of a controller 15 of the matrix convertor 1. As illustrated in FIG. 8, the controller 15 includes a rotation speed detector 51, a determiner 52, and a d-axis current command generator 53. In the following description, identical components and functions of the controller 15 illustrated in FIGS. 5 and 8 will be denoted with the same reference numerals and will not be elaborated here.

The rotation speed detector 51 detects the rotation speed $\omega_G$ of the rotating electric machine 2 based on rotation position $\theta_G$. For example, the rotation speed detector 51 differentiates the rotation position $\theta_G$ to calculate the rotation speed $\omega_G$.

The determiner 52 determines whether the rotation speed $\omega_G$ is equal to or lower than a predetermined threshold ωth (which is an example of the predetermined value). When the determiner 52 determines that the rotation speed $\omega_G$ is not equal to or lower than the predetermined threshold ωth, the determiner 52 notifies the d-axis current command generator 53 of determination information Sm indicating a first mode. When the determiner 52 determines that the rotation speed $\omega_G$ is equal to or lower than the predetermined threshold ωth, the determiner 52 notifies the d-axis current command generator 53 of determination information Sm indicating a second mode.

It is noted that the threshold ωth is set at a larger value than the rotation speed $\omega_G$ that is necessary for acquiring the generation power $P_G$ to make the reactive power Qgrid zero by regulating the input power factor angle θin. For example, when the matrix convertor 1 has the property illustrated in FIG. 3 as a result of regulating the input power factor angle θin, the threshold ωth is set within a range of 30% to 33% of the rated speed of the rotating electric machine 2.

When the d-axis current command generator 53 is notified of the determination information Sm indicating the first mode from the determiner 52, the d-axis current command generator 53 outputs a d-axis current command Id* set at zero. When the d-axis current command generator 53 is notified of the determination information Sm indicating the second mode from the determiner 52, the d-axis current command generator 53 generates a d-axis current command Id* based on the input power factor angle command θin* generated in accordance with the reactive current $IQ_{RST}$ or the reactive power $Q_{RST}$. For example, in the second mode, the d-axis current command generator 53 generates a d-axis current command Id* having a magnitude corresponding to the input power factor angle command θin*.

It is noted that in the second mode, the d-axis current command generator 53 may output a d-axis current command Id* having a predetermined fixed value other than zero. Alternatively, in the second mode, the d-axis current command generator 53 may output a d-axis current command Id* corresponding to the rotation speed $\omega_G$.

In the above-described embodiment, the matrix convertor 1 causes lagging reactive current to flow from the power convertor 10 toward the power system 3. It is also possible to cause leading reactive current to flow from the power convertor 10 toward the power system 3. For example, when lagging reactive current flows to the power system 3 due to an element or a device disposed between the power convertor 10 and the power system 3, the controller 15 may generate a d-axis current command Id* to cause leading reactive current to flow from the power convertor 10 toward the power system 3.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A matrix converter comprising:
a power converter disposed between a power system and a rotating electric machine and comprising a plurality of bidirectional switches;
a filter disposed between the power system and the power converter; and
a controller configured to control an exciting current flowing from the power converter to the rotating electric machine and control at least one of a reactive power and a reactive current on an input side of the filter by controlling the exciting current if an input power factor angle of the power converter is out of a predetermined range,
wherein the controller comprises
a detector configured to detect at least one of the reactive power and the reactive current supplied from the matrix convertor to the power system,
a current command generator configured to generate an exciting current command based on at least one of the reactive power and the reactive current detected by the detector,
a power factor command generator configured to generate a power factor command for the power system to make at least one of the reactive current and the reactive power have a predetermined value, and
a limiter configured to limit the power factor command, and
wherein the current command generator is configured to generate the exciting current command based on a difference between the power factor command and an output of the limiter.

2. A matrix converter comprising:
a power converter disposed between a power system and a rotating electric machine and comprising a plurality of bidirectional switches; and
a controller configured to control an exciting current flowing from the power converter to the rotating electric machine and control a power factor on a side of the power system by controlling the exciting current,
wherein the controller comprises
a detector configured to detect at least one of a reactive power and a reactive current supplied from the matrix converter to the power system,
a current command generator configured to generate an exciting current command based on at least one of the reactive power and the reactive current detected by the detector,
a power factor command generator configured to generate a power factor command for the power system to make at least one of the reactive current and the reactive power have a predetermined value, and
a limiter configured to limit the power factor command within a predetermined range, and
wherein the current command generator is configured to generate the exciting current command based on a difference between the power factor command and an output of the limiter.

3. A power generation system comprising:
a power generator comprising a rotating electric machine; and
a matrix converter comprising:
a power converter disposed between a power system and the rotating electric machine and comprising a plurality of bidirectional switches;
a filter disposed between the power system and the power converter; and
a controller configured to control an exciting current flowing from the power converter to the rotating electric machine and control at least one of a reactive power and a reactive current on an input side of the filter by controlling the exciting current if an input power factor angle of the power converter is out of a predetermined range,
wherein the controller comprises
a detector configured to detect at least one of the reactive power and the reactive current supplied from the matrix convertor to the power system,
a current command generator configured to generate an exciting current command based on at least one of the reactive power and the reactive current detected by the detector,
a power factor command generator configured to generate a power factor command for the power system to make at least one of the reactive current and the reactive power have a predetermined value, and
a limiter configured to limit the power factor command, and
wherein the current command generator is configured to generate the exciting current command based on a difference between the power factor command and an output of the limiter.

4. A method for controlling a reactive current or a reactive power, the method comprising:
detecting a reactive current or a reactive power supplied from a matrix converter to a power system, the matrix converter comprising a power converter disposed between the power system and a rotating electric machine and a filter disposed between the power system and the power converter, the power converter comprising a plurality of bidirectional switches;
controlling an exciting current flowing from the power converter to the rotating electric machine and controlling at least one of the reactive power and the reactive current on an input side of the filter by controlling the exciting current if an input power factor angle of the power converter is out of a predetermined range;
generating a power factor command for the power system to make at least one of the reactive current and the reactive power have a predetermined value; and
limiting the power factor command, wherein the controlling step comprises:
  generating an exciting current command based on at least one of the detected reactive power and the detected reactive current, and
  controlling the power converter based on the exciting current command, and
  wherein the exciting current command generating step comprises generating the exciting current command based on a difference between a first value and a second value of the power factor command, the first value being a value before the power factor command is limited, the second value being a value after the power factor command has been limited.

5. A method for controlling a power factor, the method comprising:
  detecting a reactive current or a reactive power supplied from a matrix converter to a power system, the matrix converter comprising a power converter disposed between the power system and a rotating electric machine, the power converter comprising a plurality of bidirectional switches;
  controlling an exciting current flowing from the power converter to the rotating electric machine and controlling a power factor on a side of the power system based on at least one of the reactive current and the reactive power by controlling the exciting current;
  generating a power factor command for the power system to make at least one of the reactive current and the reactive power have a predetermined value; and
  limiting the power factor command within a predetermined range,
  wherein the controlling step comprises
    generating an exciting current command based on at least one of the detected reactive power and the detected reactive current, and
    controlling the power converter based on the exciting current command, and
  wherein the exciting current command generating step comprises generating the exciting current command based on a difference between a first value and a second value of the power factor command, the first value being a value before the power factor command is limited, the second value being a value after the power factor command has been limited.

6. A matrix converter comprising:
  a power converter disposed between a power system and a rotating electric machine and comprising a plurality of bidirectional switches;
  a filter disposed between the power system and the power converter; and
  means for controlling an exciting current flowing from the power converter to the rotating electric machine and for controlling at least one of a reactive power and a reactive current on an input side of the filter by controlling the exciting current if an input power factor angle of the power converter is out of a predetermined range,
  wherein the means for controlling the exciting current comprises
  a detector configured to detect at least one of the reactive power and the reactive current supplied from the matrix convertor to the power system,
  a current command generator configured to generate an exciting current command based on at least one of the reactive power and the reactive current detected by the detector,
  a power factor command generator configured to generate a power factor command for the power system to make at least one of the reactive current and the reactive power have a predetermined value, and
  a limiter configured to limit the power factor command, and
  wherein the current command generator is configured to generate the exciting current command based on a difference between the power factor command and an output of the limiter.

* * * * *